J. Y. SMITH.
Car Wheel.
No. 86,878. Patented Feb. 9, 1869.
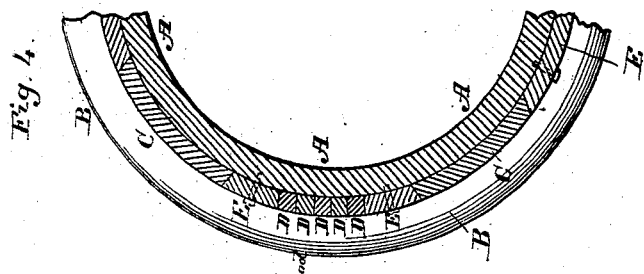
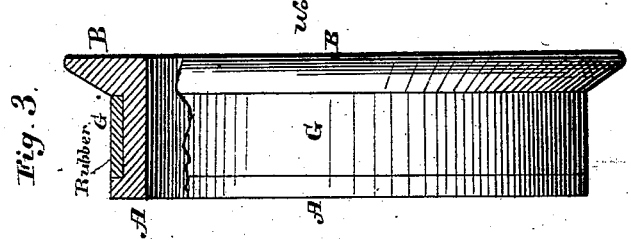
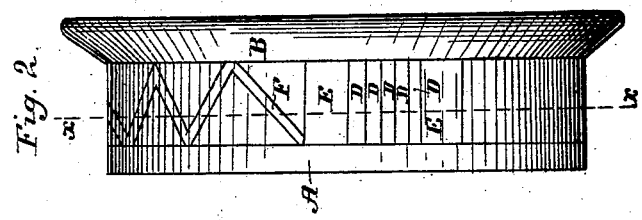
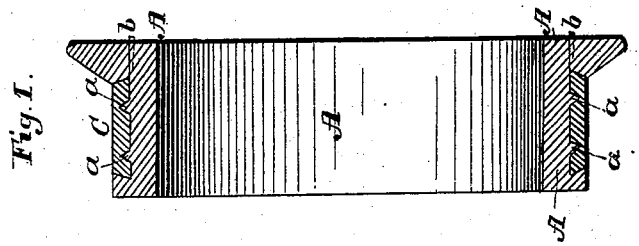

United States Patent Office.

JOHN Y. SMITH, OF PITTSBURG, PENNSYLVANIA.

Letters Patent No. 86,878, dated February 9, 1869.

IMPROVED CAR-WHEEL.

The Schedule referred to in these Letters Patent and making part of the same.

*To all whom it may concern:*

Be it known that I, JOHN Y. SMITH, of Pittsburg, in the county of Allegheny, and State of Pennsylvania, have invented a new and useful Improvement in Tires for Driving-Wheels of Locomotive-Engines; and I do hereby declare that the following is a full, clear, and exact description of the same, reference being had to the annexed drawing, making part of this specification, in which—

Figure 1 is a sectional central elevation of my improved tire, showing the removable flange, and the segments of wood of which the tire is composed.

Figure 2 is an elevation of the tire, showing the partitions which may be used to form pockets for the reception of the segments of wood, and also a means of using concrete, or other substance, in the tread of the wheel, when the same is made of wood.

Figure 3 is an elevation, partly in section, showing how a band or hoop of vulcanized rubber may be used to form the tread of the wheel.

Figure 4 is a transverse section of portion of the tire on line x x of fig. 2, showing the different methods of inserting the wooden tread.

Corresponding letters denote corresponding parts in the several figures.

A is a hoop or band, of cast or wrought-iron, which is to be formed of any desired thickness, and of the size required to fit the spider or centre of the wheel, upon which it is to be placed.

Upon the outer edge of the tire or hoop, a flange is raised or formed, the inner edge of which is of dovetail-form, shown in fig. 1.

Upon the periphery of this hoop are formed, either by being cast or rolled thereon, wedge-shaped projections, which may extend entirely around its circumference, with the exception of those points where the surface is raised, for the purpose of forming pockets or chambers for the reception of the segments D, hereafter to be described.

B is a flange for the tire or hoop A, which is to be made separate therefrom, but so as to fit upon the inner edge thereof, where it is to be held by means of the screws b, inserted as shown in fig. 1, or so that one half of such screw will rest in the flange B, and the other half in the rim or hoop A; or they may be screwed into the hoop, and hold the flange in its place by means of their heads, which may be so constructed as to extend over or upon the flange for that purpose.

It will be observed that, when this flange and hoop are united, as above described, they together form a tire, having upon its circumference a recess, the edges of which are of dovetail-form, so that, as the staves or segments D are driven, and their inner ends acted upon by the projections a, a portion of their outer edges will be forced outward and under the overhanging portions of such recess.

C C are segments of wood, which may be bent or otherwise formed to fit the dovetailed recess, above named, and which may, if desired, have zigzag grooves or recesses formed in their outer surfaces, for the reception of concrete, or any other substance which will tend to prevent the wheel from slipping when shod with such tires.

D represents staves or segments of wood, inserted into the circumference of the tire in such a manner as to present their ends, or such of their parts as are at a right angle with the grain of such wood, to this surface and to their bearing-points upon the rail.

These staves or segments may be constructed of the form required to fit into the dovetailed groove, and inserted therein, and then the flange B may be pressed upon them by means of the recesses b, or they may be made with their outer edges parallel, and have a notch or notches formed in their inner ends, as shown in fig. 1, so that, as they are driven into such recess, their outer edges will be forced outward and under the edges of the recess by means of the wedge-shaped projections a a, shown in fig. 1.

E E are projections upon the periphery of the rim or hoop A, which may be cast or otherwise formed thereon, or they may be bolted thereto, as shown in fig. 4 of the drawings.

The office of these projections is to divide the circumference of the hoop into pockets or chambers, for the reception of the staves or segments of wood, and to facilitate the placing of such segments in their positions therein. They may, however, be dispensed with, if preferred.

F F are zigzag slots or grooves, formed in the circumference of the segments composing the tread of the tire, and which may be filled with concrete, or any other substance, which will serve to prevent the wheel from slipping, as above described.

G, in fig. 2, shows how vulcanized rubber may be used in a tire having no removable flange, but it is evident that the tire shown in fig. 1 is better adapted to its use than the one shown in fig. 4, for the reason that, in cases where such a flange is used, the rim or hoop of rubber could be made complete at the factory, and sent direct to the consumer, without the necessity of sending the tire, to be provided with such hoop, to the manufacturer of the same, to be fitted thereto.

It will be apparent that that portion of the rim or hoop which is outside of the same, may be made removable, instead of the inside flange, if desirable, as it probably will be in certain cases, as it would facilitate the repairs of the tire when it is fast upon the wheel, or when the wheels are in their positions in or under the engine.

Some of the advantages to be derived from my invention, are, first, additional adhesion, and reduced wear upon the rails, in cases where wooden rails are used, which is regarded as of great importance, in view of the fact that so many wooden railroads are now being built in connection with the iron and coal-mines of the country; secondly, it affords increased facilities for repairing, from the fact that, at any time, the tire may have a new tread formed upon it, by simply renewing the wood or rubber of which it is composed, and this may be done, in cases of emergency, without removing the wheels from the engines.

Having thus described my invention,

What I claim, and desire to secure by Letters Patent, is—

1. The construction of a tire having a removable flange upon its edge, and a dovetailed recess upon its circumference, substantially as shown and described.

2. The construction of a tire, having the wedge-like projections *a a* upon its surface, substantially as and for the purpose described.

3. The combination of the staves or segments D, hoop or rim A, and flange B, substantially as shown and described.

4. Arranging the zigzag grooves in the periphery of the segments or circumference of the tire, substantially as and for the purpose described.

In testimony whereof, I have signed my name to this specification, in the presence of two subscribing witnesses.

JOHN Y. SMITH.

Witnesses:
D. P. HOLLOWAY,
C. F. CLAUSEN.